B. C. ZUHARS AND H. D. CLARKE.
ASSEMBLY OF DIFFERENTIAL, TRANSMISSION, AND CLUTCH HOUSINGS.
APPLICATION FILED FEB. 6, 1920.
1,360,857.
Patented Nov. 30, 1920.
2 SHEETS—SHEET 1.
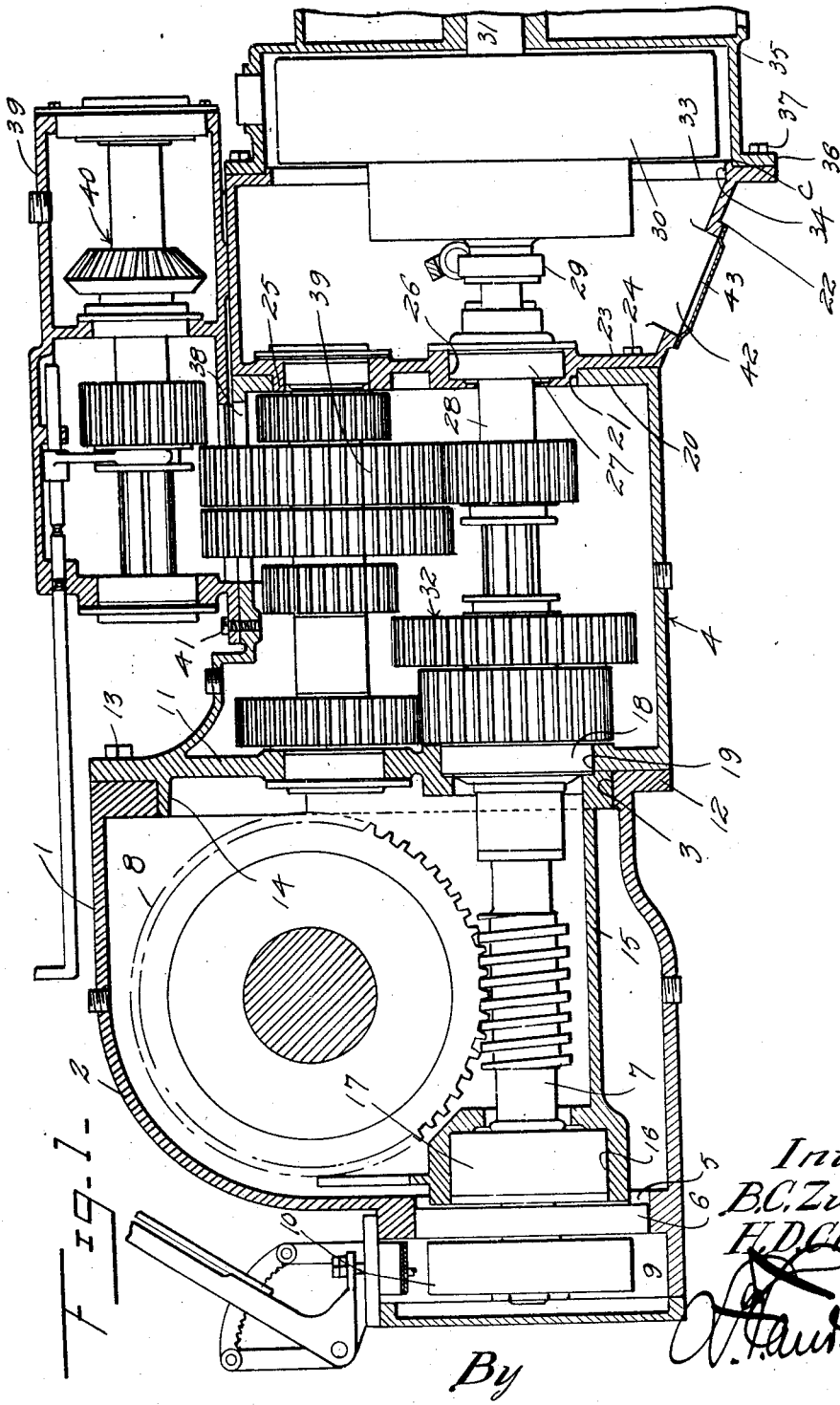

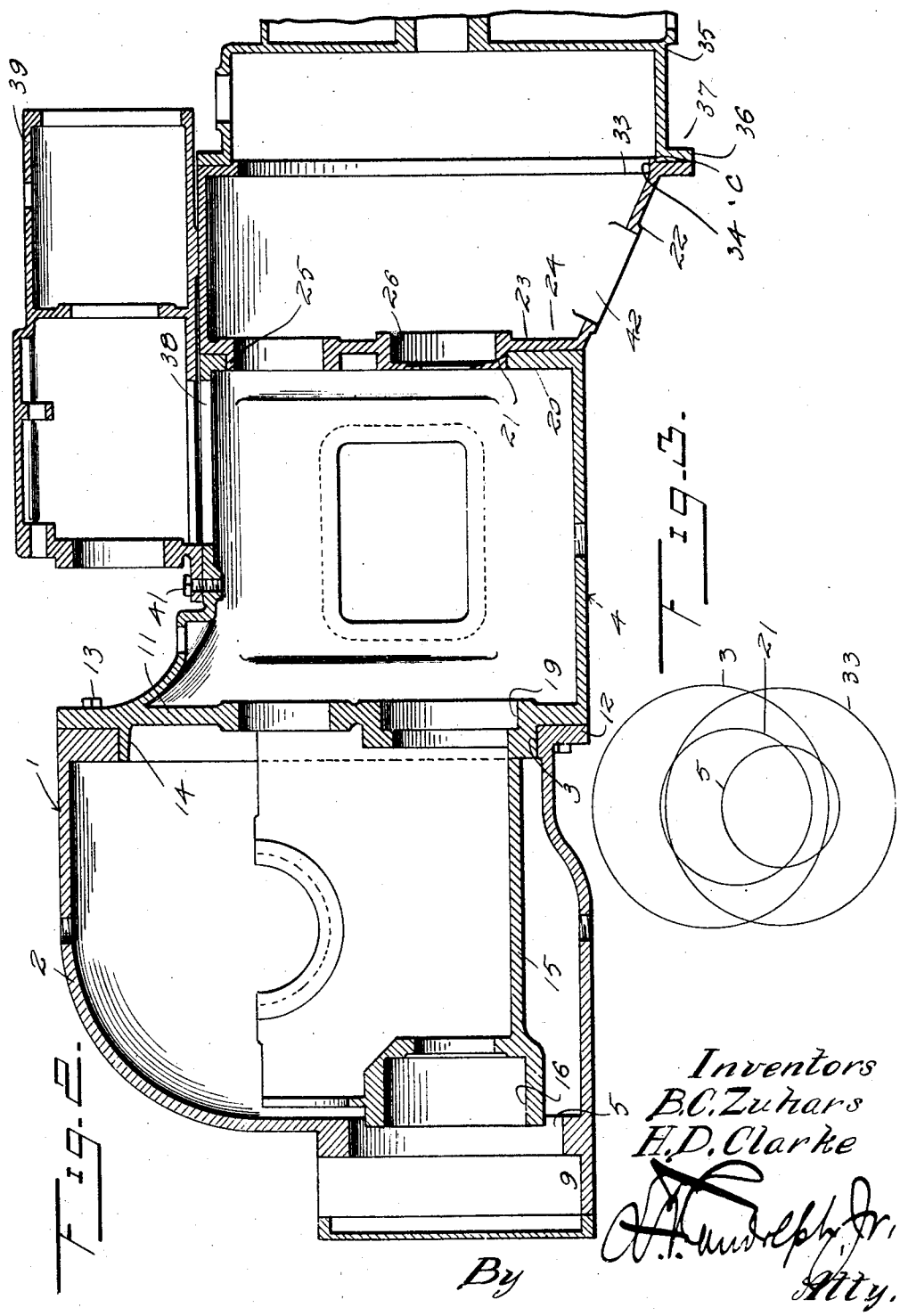

UNITED STATES PATENT OFFICE.

BENJAMIN C. ZUHARS AND HARRY D. CLARKE, OF COLUMBUS, OHIO, ASSIGNORS TO THE OHIO TRACTOR COMPANY, OF COLUMBUS, OHIO, A CORPORATION OF OHIO.

ASSEMBLY OF DIFFERENTIAL, TRANSMISSION, AND CLUTCH HOUSINGS.

1,360,857.   Specification of Letters Patent.   Patented Nov. 30, 1920.

Application filed February 6, 1920. Serial No. 356,746.

*To all whom it may concern:*

Be it known that we, BENJAMIN C. ZUHARS and HARRY D. CLARKE, citizens of the United States, residing at Grand View Heights, Columbus, in the county of Franklin and State of Ohio, have invented certain new and useful Improvements in Assembly of Differential, Transmission, and Clutch Housings; and we do hereby declare the following to be a full, clear, and exact description of the invention, such as will enable others skilled in the art to which it appertains to make and use the same.

This invention relates to new and useful improvements in differential, transmission and clutch housings and more particularly to assembling such housings so that when secured together they form a single or continuous unit which prevents relative movement of the housings in relation to each other that obviates any danger of the parts confined therein from becoming out of alinement.

Another object of this invention is the provision of a male and female connection or joint between each pair of housings which lessens the strain on the fastening means between said pair of housings and makes it possible to keep all units in better operating alinement than was heretofore possible and reduces the space on the tractor or motor vehicle required to accommodate such structure.

A further object of this invention is the provision of means whereby the centers of the openings in the differential, transmission and clutch housings and rear pilot opening for the worm shaft of the differential, are arranged eccentrically to each other so that the forces created by the driving or braking action, that have a tendency to rotate one housing about the other, are consumed by the flanges and walls of the openings in the housings, thereby relieving the strain on the fastening means between said housings.

With these and other objects in view as will become more apparent as the description proceeds, the invention consists in certain novel features of construction, combination, and arrangement of parts as will be hereinafter more fully described and claimed.

For a complete understanding of our invention, reference is to be had to the following description, and accompanying drawings, in which Figure 1 is a vertical sectional view illustrating assembly of differential, transmission and clutch housings with differential, transmission and clutch located therein, Fig. 2 is a vertical sectional view of the housings assembled with the differential, transmission and clutch removed, Fig. 3 is a diagrammatical view, illustrating the openings in the housings and the rear pilot bearing opening in relation to each other.

Referring in detail to the drawings, the numeral 1 indicates a differential housing which has a bowl or enlarged portion 2 provided with an opening 3 in its front wall to receive and be closed by the rear end of a transmission housing 4. The differential housing 1 or the bowl 2 at its rear end is provided with an opening 5 to receive a rear pilot bearing 6 which rotatably supports the rear end of a worm shaft 7 of a differential 8 located in the bowl 2 of the differential housing 1 and permits said worm shaft 7 to extend into a brake housing 9 formed integrally with the differential housing 1 so that a brake mechanism 10 can operate on the rear end of the worm shaft. The center of the opening 5 is located eccentrically to the center of the opening 3 as illustrated in the diagrammatical view.

The transmission housing 4 has its rear end closed by a rear wall 11 which abuts the flange 12 about the opening 3 of the differential housing 1 and is secured thereto by fasteners 13. An annular flange 14 is formed on the wall 11 and pilots or fits in the opening 3 forming a male and female connection between the transmission and differential housing 1.

A hanger 15 is formed integrally with the flange 14 and extends into the bowl 2 of the differential housing 1 and rotatably supports the differential 8 and has a bearing opening 16 in its rear portion and in alinement with the opening 5 and receives a bearing 17 that rotatably supports the worm shaft 7. The forward end of the worm shaft 7 is journaled in a bearing 18 located in a bearing opening 19 formed in the rear wall 11 of the transmission housing 4 and which is in horizontal alinement with the bearing opening 16 of said hanger thereby permitting of the bearings 6, 17 and 18 to be disposed in horizontal alinement.

An inwardly directed annular flange 20 is formed on the forward end of the transmission housing 4 and defines an opening 21, the center of which is located eccentrically to the center of the opening 3 and also the opening 5. A clutch housing 22 has its rear end closed by a wall 23 which is secured to the flange 20 by fasteners 24. An annular flange 25 is formed on the wall 23 of the clutch housing 22 and pilots or fits in the opening 21 of the transmission housing 4. A bearing opening 26 is formed in the wall 23 and is in horizontal alinement with the opening 19 of the rear wall 11 of the transmission housing 4 and said bearing opening 26 receives a bearing 27 that rotatably supports a power shaft 28. The forward end of the power shaft 28 is confined within the clutch housing 22 and has a clutch 29 associated with a fly wheel 30 on the crank shaft 31 of an engine (not shown).

The power shaft 28 extends rearwardly into the transmission housing 4 and is adapted to be connected to the worm shaft 7 through a transmission 32 that forms subject matter of a co-pending application serially numbered 356,749 and filed Feb. 6, 1920.

It is to be noted that the worm shaft 7, power shaft 28 and crank shaft of the motor are in horizontal alinement, obviating the employment of universal joints and like connections which are necessary when the engine is located in a different plane from that of the power shaft of the transmission and the driven shaft of the differential.

The opening 33 of the front end of the clutch housing 22 has its center located eccentrically through the opening 3 of the differential housing 1 and the opening 21 of the transmission housing 4, and an annular flange 34 is disposed about the opening 33 and fits or pilots in the rear end of the crank case or housing 35 of the engine (not shown) and the crank case 35 has an annular flange 36 which is secured to the front end of the clutch housing 22 by fasteners 37, the center of the opening 33 is located concentrically to the center of the opening 5 in the differential housing 1.

The opening 3 in the differential housing, the opening 21 in the transmission housing and the opening 33 in the clutch housing have an eccentric arrangement relatively, whereby to place upon the flanges 14, 25, and 34 and the walls of said openings, the entire burden of holding the housings against any relative rotation under the rotative forces transmitted thereto by the gearing during either a driving or braking action thereof. This prevents any lateral forces from being placed upon the fastening elements which are employed to connect the housings together.

The top wall of the transmission housing 4 is provided with an opening 38 to permit the idle gear 39 of the transmission 32 to project outwardly of said housing and be received in a power take-off housing 39 having a power take-off 40 which with the power take-off housing 39 forms subject matter for a co-pending application. The power take-off housing 39 is secured to the transmission housing 4 by fasteners 41 and is also secured to the top of the clutch housing 22 which aids in securing the clutch and transmission housing together.

The lower portion of the clutch housing 22 is provided with a hand opening 42 so that the clutch 29 can be adjusted and which is closed by a cover plate 43.

While we have shown and described the preferred embodiment of our invention, it will be understood that minor changes in construction, combination, and arrangement of parts may be made without departing from the spirit and scope of the invention as claimed.

Having thus described our invention, what we claim is:—

1. A device of the character set forth comprising differential, transmission and clutch housings each having an opening to receive the end of the other and the centers of said openings arranged eccentrically to each other.

2. In combination, a housing assembly comprising differential, transmission and clutch housings, a speed changing mechanism mounted in the transmission and clutch housings, means connecting the adjacent ends of the housings against endwise displacement, and means establishing an interfitting connection between the adjacent ends of the housings, said means being adapted independently of the first means and the speed changing mechanism for preventing the housings from having any rotative movement relatively.

3. A housing assembly comprising differential, transmission and clutch housings, means connecting the adjacent ends of the housings against endwise displacement, and means establishing an interfitting connection between the adjacent ends of the housings, said means being adapted independently of the first means to prevent the housings from having any rotative movement relatively and consisting of annular flanges on certain end walls of said housings fitting in annular openings in other end walls of said housings.

4. A housing assembly comprising differential, transmission and clutch housings, means conecting the adjacent ends of the housings against endwise displacement, and means establishing an interfitting connection between the adjacent ends of the housings, said means being adapted independently of the first means to prevent the housings from having any rotative movements relatively and consisting of flanges on certain end walls of said housings fitting in openings in other end walls of said housings.

5. A housing assembly comprising differential, transmission and clutch housings each having an opening and the center of each opening being eccentrically arranged to the center of the other opening, end walls for the transmission and clutch housings fitting in the openings of the differential and transmission housings, and means securing the housings against endwise movement.

6. A housing assembly comprising differential, transmission and clutch housings each having an opening and the center of each opening being arranged eccentrically to the center of the other openings, end walls for the transmission and clutch housings, said end wall of the transmission closing the opening in the differential housing, said end wall of the clutch housing closing the opening in the transmission housing, flanges formed on said end walls and fitting in their respective openings.

7. A housing assembly comprising differential, transmission and clutch housings each having openings and the centers of said openings being arranged eccentrically to each other, end walls of the transmission and clutch housings closing the openings in the differential and transmission housings, flanges formed on said end walls and fitting in the openings of the differential and transmission housings, said differential having a rear opening and said opening having its center located eccentrically to the first named openings and a pilot bearing in said opening for receiving the rear end of the power shaft of a differential.

In testimony whereof we affix our signatures in presence of two witnesses.

BENJAMIN C. ZUHARS.
HARRY D. CLARKE.

Witnesses:
   JAMES F. LAUGHRAD,
   JOSEPH MARVIN.